US012633154B2

(12) United States Patent
Sakai

(10) Patent No.: US 12,633,154 B2
(45) Date of Patent: May 19, 2026

(54) POSTURE ESTIMATION APPARATUS, POSTURE ESTIMATION SYSTEM, POSTURE ESTIMATION METHOD, AND NON-TRANSITORY COMPUTER-READABLE MEDIUM STORING PROGRAM

(71) Applicant: NEC Corporation, Tokyo (JP)

(72) Inventor: Masahito Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/842,539

(22) PCT Filed: Mar. 14, 2022

(86) PCT No.: PCT/JP2022/011301
    § 371 (c)(1),
    (2) Date: Aug. 29, 2024

(87) PCT Pub. No.: WO2023/175669
    PCT Pub. Date: Sep. 21, 2023

(65) Prior Publication Data
    US 2025/0174034 A1      May 29, 2025

(51) Int. Cl.
    *G06V 40/10*        (2022.01)
    *G06V 10/98*        (2022.01)
    *H04N 23/611*       (2023.01)
    *H04N 23/69*        (2023.01)

(52) U.S. Cl.
    CPC .............. *G06V 40/10* (2022.01); *G06V 10/98* (2022.01); *H04N 23/611* (2023.01); *H04N 23/69* (2023.01)

(58) Field of Classification Search
    CPC ...................................................... G06V 40/10

USPC ............................................................ 348/77
    See application file for complete search history.

(56) References Cited

U.S. PATENT DOCUMENTS

| | | | | |
|---|---|---|---|---|
| 2010/0272328 A1* | 10/2010 | Lee | ...................... | G06V 40/166 348/135 |
| 2015/0215546 A1* | 7/2015 | Adachi | .................. | H04N 23/69 348/240.2 |

FOREIGN PATENT DOCUMENTS

| | | |
|---|---|---|
| JP | 2017-73722 A | 4/2017 |
| JP | 2019-29998 A | 2/2019 |
| JP | 2019-110525 A | 7/2019 |
| JP | 2019-121045 A | 7/2019 |
| JP | 2020-71717 A | 5/2020 |
| JP | 2020-201558 A | 12/2020 |
| WO | 2019/111550 A1 | 6/2019 |

OTHER PUBLICATIONS

International Search Report for PCT Application No. PCT/JP2022/011301, mailed on Jun. 7, 2022.

* cited by examiner

*Primary Examiner* — Amir Shahnami
(74) *Attorney, Agent, or Firm* — Sughrue Mion, PLLC

(57) ABSTRACT

A posture estimation apparatus includes a subject detection unit, a size determination unit, a size adjustment processing unit, and a posture detection unit. The subject detection unit detects a subject who is a person appearing in a captured image. The size determination unit determines a size of the subject. The size adjustment processing unit performs processing of adjusting the size of the subject to fall within a predetermined range when the size of the subject is out of the predetermined range. The posture detection unit detects a posture of the subject based on an image in which the size of the subject falls within the predetermined range.

15 Claims, 11 Drawing Sheets

POSTURE ESTIMATION APPARATUS, POSTURE ESTIMATION SYSTEM, POSTURE ESTIMATION METHOD, AND NON-TRANSITORY COMPUTER-READABLE MEDIUM STORING PROGRAM

This application is a National Stage Entry of PCT/JP2022/011301 filed on Mar. 14, 2022, the contents of all of which are incorporated herein by reference, in their entirety.

TECHNICAL FIELD

The present disclosure relates to a posture estimation apparatus, a posture estimation system, a posture estimation method, and a non-transitory computer-readable medium storing a program.

BACKGROUND ART

In recent years, a method for detecting whether a person appears in an image or a video captured by a camera and further automatically detecting a posture of the detected person (Patent Literatures 1 to 5) has been widely used.

For example, a method for improving posture detection accuracy by detecting a posture after extracting a head region of a person from an image and rotating the image such that the head is oriented in a predetermined direction (Patent Literature 1) has been proposed. In addition, a method for improving posture detection accuracy by performing super-resolution processing on an image having low posture detection accuracy (Patent Literature 2) has also been proposed.

CITATION LIST

Patent Literature

Patent Literature 1: Japanese Unexamined Patent Application Publication No. 2019-121045
Patent Literature 2: Japanese Unexamined Patent Application Publication No. 2020-201558
Patent Literature 3: Japanese Unexamined Patent Application Publication No. 2019-110525
Patent Literature 4: Japanese Unexamined Patent Application Publication No. 2019-29998
Patent Literature 5: Japanese Unexamined Patent Application Publication No. 2017-73722

SUMMARY OF INVENTION

Technical Problem

However, in the general posture detection method as described above, if a size of a subject who is a person appearing in an image of a camera is too large, the size of the subject deviates from a size in which a posture can be suitably detected, and the posture cannot be accurately detected. In addition, if the size of the subject who has appeared is too small, the number of pixels necessary for detecting a posture cannot be obtained, and the posture cannot be accurately detected.

The present disclosure has been made in view of the aforementioned circumstances, and an object of the present disclosure is to accurately detect a posture of a subject appearing in an image by appropriately adjusting a size of the subject.

Solution to Problem

A posture estimation apparatus according to an aspect of the present disclosure includes: subject detection means for detecting a subject who is a person appearing in a captured image; size determination means for determining a size of the subject; size adjustment processing means for performing processing of adjusting the size of the subject to fall within a predetermined range when the size of the subject is out of the predetermined range; and posture detection means for detecting a posture of the subject based on an image in which the size of the subject falls within the predetermined range.

A posture estimation system according to an aspect of the present disclosure includes: an imaging apparatus configured to output an image obtained by imaging a monitoring target zone; and a posture estimation apparatus configured to detect a posture of a subject who is a person appearing in the image, in which the posture estimation apparatus includes: subject detection means for detecting the subject; size determination means for determining a size of the subject; size adjustment processing means for performing processing of adjusting the size of the subject to fall within a predetermined range when the size of the subject is out of the predetermined range; and posture detection means for detecting a posture of the subject based on an image in which the size of the subject falls within the predetermined range.

A posture estimation system according to an aspect of the present disclosure includes: an imaging apparatus configured to output an image obtained by imaging a monitoring target zone; and a posture estimation apparatus built in the imaging apparatus, and configured to detect a posture of a subject who is a person appearing in the image, in which the posture estimation apparatus includes: subject detection means for detecting the subject; size determination means for determining a size of the subject; size adjustment processing means for performing processing of adjusting the size of the subject to fall within a predetermined range when the size of the subject is out of the predetermined range; and posture detection means for detecting a posture of the subject based on an image in which the size of the subject falls within the predetermined range.

A posture estimation method according to an aspect of the present disclosure includes: detecting a subject who is a person appearing in a captured image; determining a size of the subject; performing processing of adjusting the size of the subject to fall within a predetermined range when the size of the subject is out of the predetermined range; and detecting a posture of the subject based on an image in which the size of the subject falls within the predetermined range.

A non-transitory computer-readable medium according to an aspect of the present disclosure stores a program for causing a computer to execute: processing of detecting a subject who is a person appearing in a captured image; processing of determining a size of the subject; processing of performing processing of adjusting the size of the subject to fall within a predetermined range when the size of the subject is out of the predetermined range; and processing of detecting a posture of the subject based on an image in which the size of the subject falls within the predetermined range.

Advantageous Effects of Invention

According to the present disclosure, a posture of a subject appearing in an image can be accurately detected by suitably adjusting a size of the subject.

EXAMPLE EMBODIMENT

Figure 1:
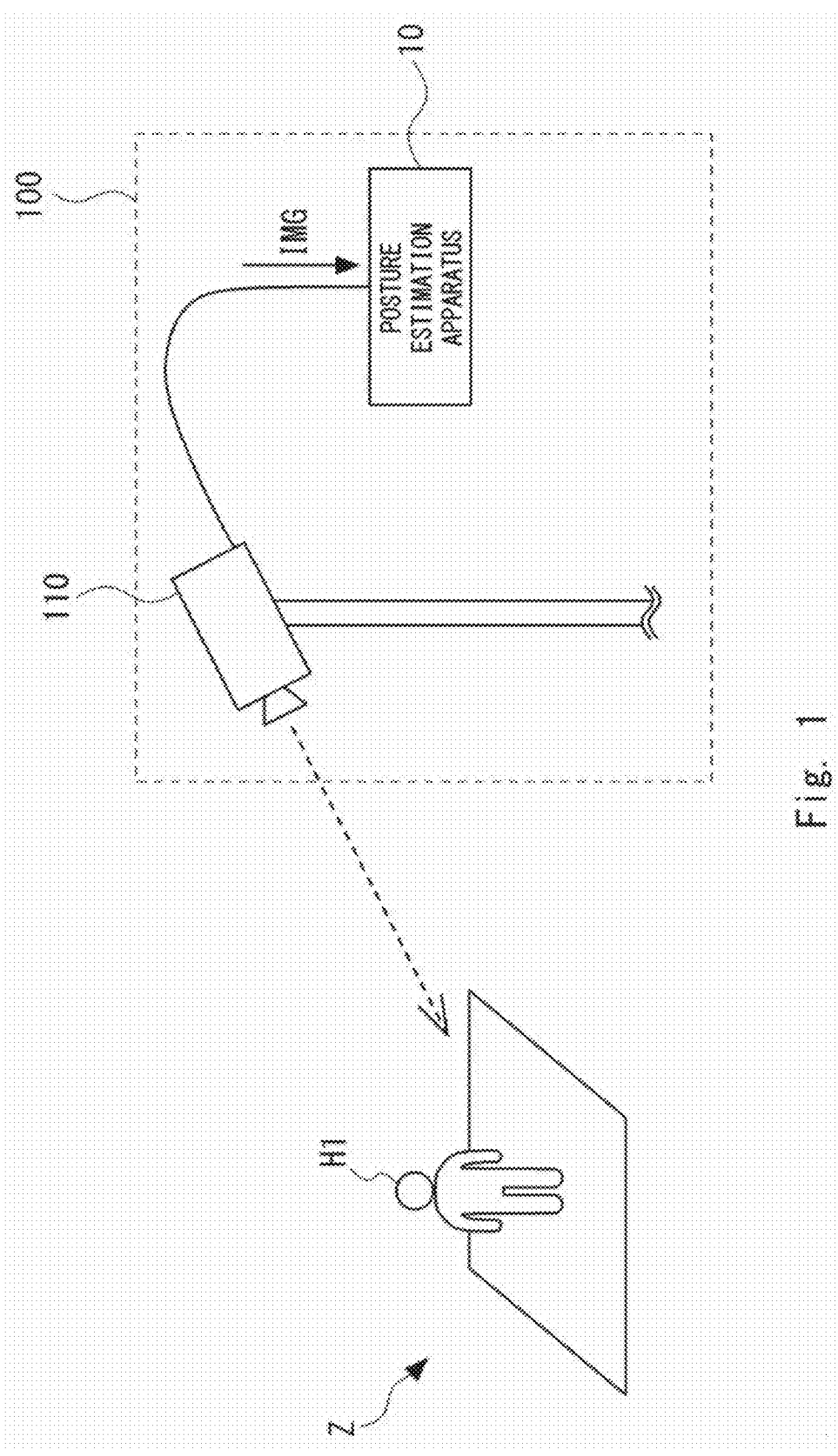
FIG. 1 is a diagram schematically illustrating a configuration of a posture estimation system according to a first example embodiment.

Hereinafter, example embodiments of the present invention will be described with reference to the drawings. In the drawings, the same elements are denoted by the same reference signs, and redundant description will be omitted as necessary.

First Example Embodiment

A posture estimation system according to a first example embodiment will be described. FIG. 1 schematically illustrates a configuration of a posture estimation system 100 according to the first example embodiment. The posture estimation system 100 includes a camera 110 and a posture estimation apparatus 10. The camera 110 is configured as an imaging apparatus that continuously captures an image of a monitoring target zone Z, for example, to be acquired as a video, and outputs the acquired image IMG to the posture estimation apparatus 10. The camera 110 may be capable of capturing an image in the non-visible light range such as infrared light, not limited to visible light, and may be capable of appropriately projecting illumination light onto the monitoring target zone Z. The posture estimation apparatus 10 detects a subject who is a person appearing in the acquired image IMG, performs image processing as necessary, and detects a posture of the detected subject. The camera 110 and the posture estimation apparatus 10 are connected to each other by various wired or wireless communication means.

Figure 2:
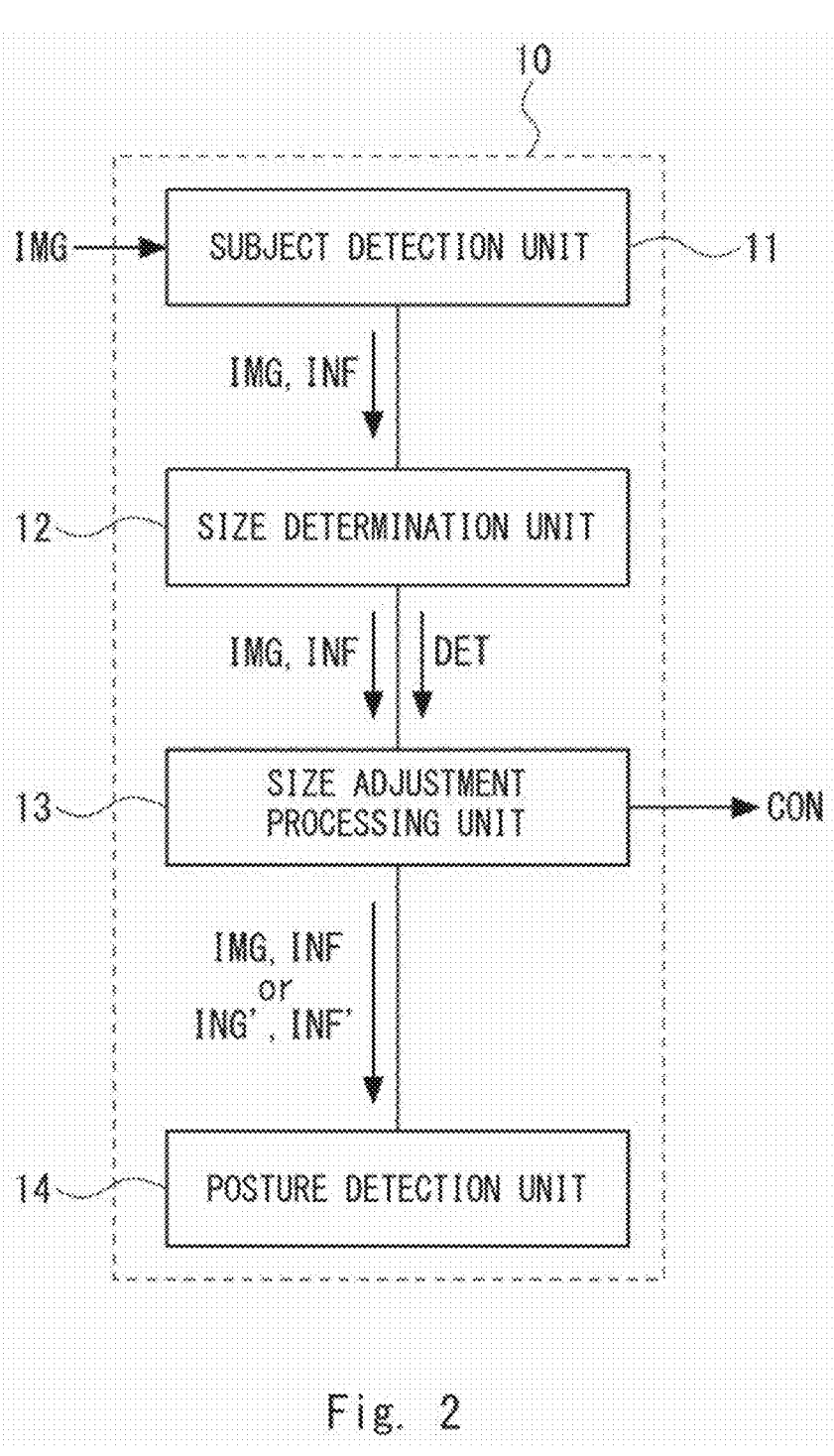
FIG. 2 is a diagram schematically illustrating a configuration of a posture estimation apparatus according to the first example embodiment.

The posture estimation apparatus 10 will be described. FIG. 2 schematically illustrates a configuration of the posture estimation apparatus 10 according to the first example embodiment. The posture estimation apparatus 10 includes a subject detection unit 11, a size determination unit 12, a size adjustment processing unit 13, and a posture detection unit 14.

Referring to the image IMG received from the camera 110, the subject detection unit 11 determines whether a subject appears in the image IMG, and detects the subject when the subject appears. In order to determine whether a subject appears in the image IMG, a predetermined condition given in advance for determining whether the object appearing in the image is a person may be used, or the image IMG may be input to a learned model constructed by various types of machine learning to detect a person estimated as a subject. Specifically, for example, a YOLO (You Look Only Once) method, a SSD (Single Shot multibox Detector) method, a Faster RCNN (Region-based Convolutional Neural Networks) method, or the like may be used to detect the subject. The subject detection unit 11 may detect a contour of the subject or may detect a subject as an aggregate of images in an area occupied by the subject. The subject detection unit 11 outputs information INF indicating the detected subject and the image IMG in which the detected subject has appeared to the size determination unit 12.

The size determination unit 12 specifies an area corresponding to the detected subject H1 appearing in the image IMG based on the information INF indicating the detected subject. Thereafter, the size determination unit 12 determines a size of the specified subject H1, and outputs a determination result RES to the size adjustment processing unit 13 together with the information INF indicating the detected subject and the image IMG.

The size adjustment processing unit 13 performs processing of changing the size of the subject H1 appearing in the image IMG as necessary based on the determination result. Note that the size adjustment processing unit 13 may not perform processing of changing the size of the subject H1 appearing in the image IMG depending on the determination result. Thereafter, the size adjustment processing unit 13 outputs the information INF indicating the subject and an image of which the size has been adjusted or an image of which the size has not been adjusted to the posture detection unit 14.

The posture detection unit 14 detects a posture of the subject H1 specified based on the information INF indicating the detected subject. In order to detect a posture, a predetermined condition given in advance for determining a posture of the subject appearing in the image may be used, or the image of the subject may be input to a learned model constructed by various types of machine learning to estimate a posture of the subject.

Figure 3:
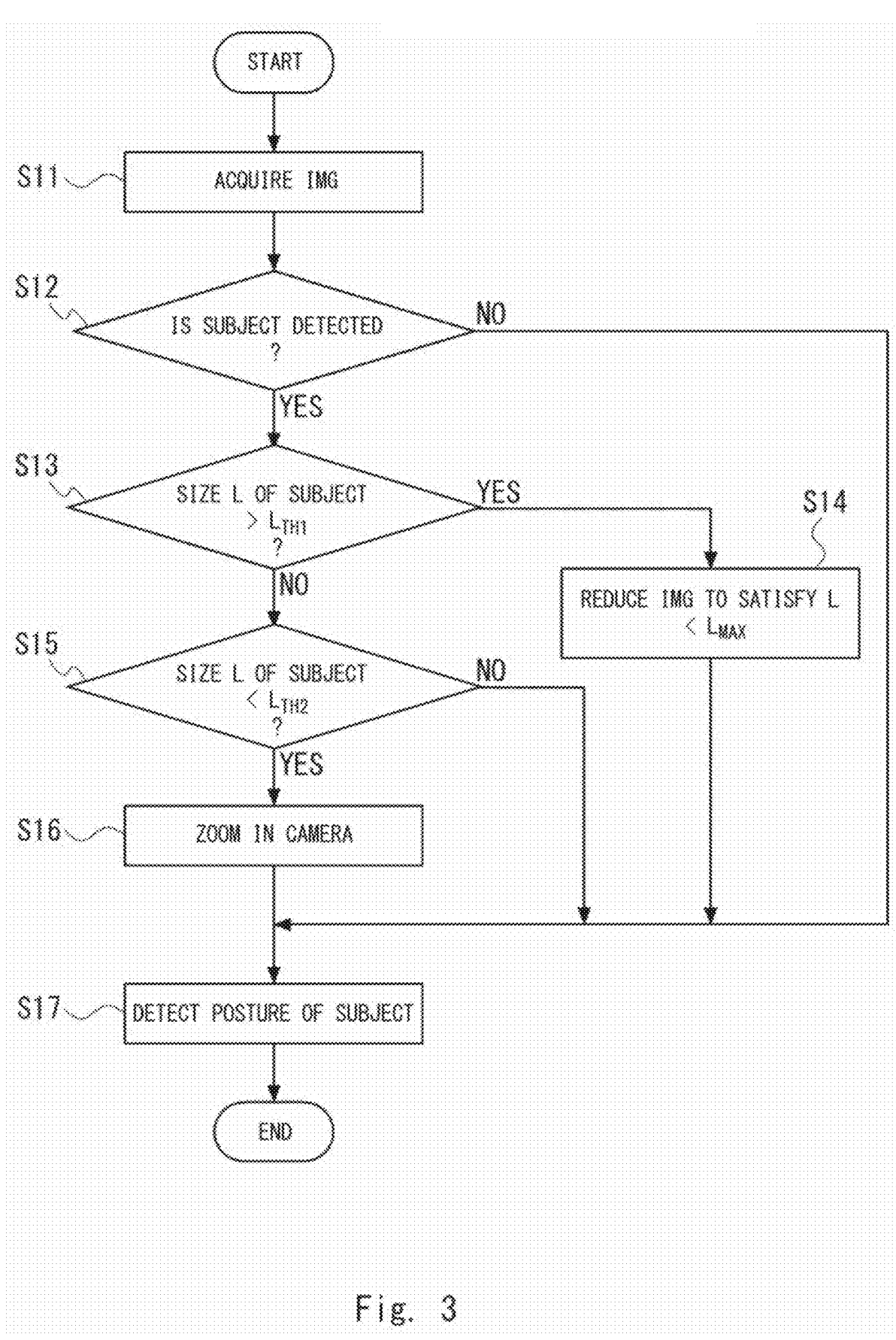
FIG. 3 is a flowchart of a posture detection operation of the posture estimation system according to the first example embodiment.
Figure 4:
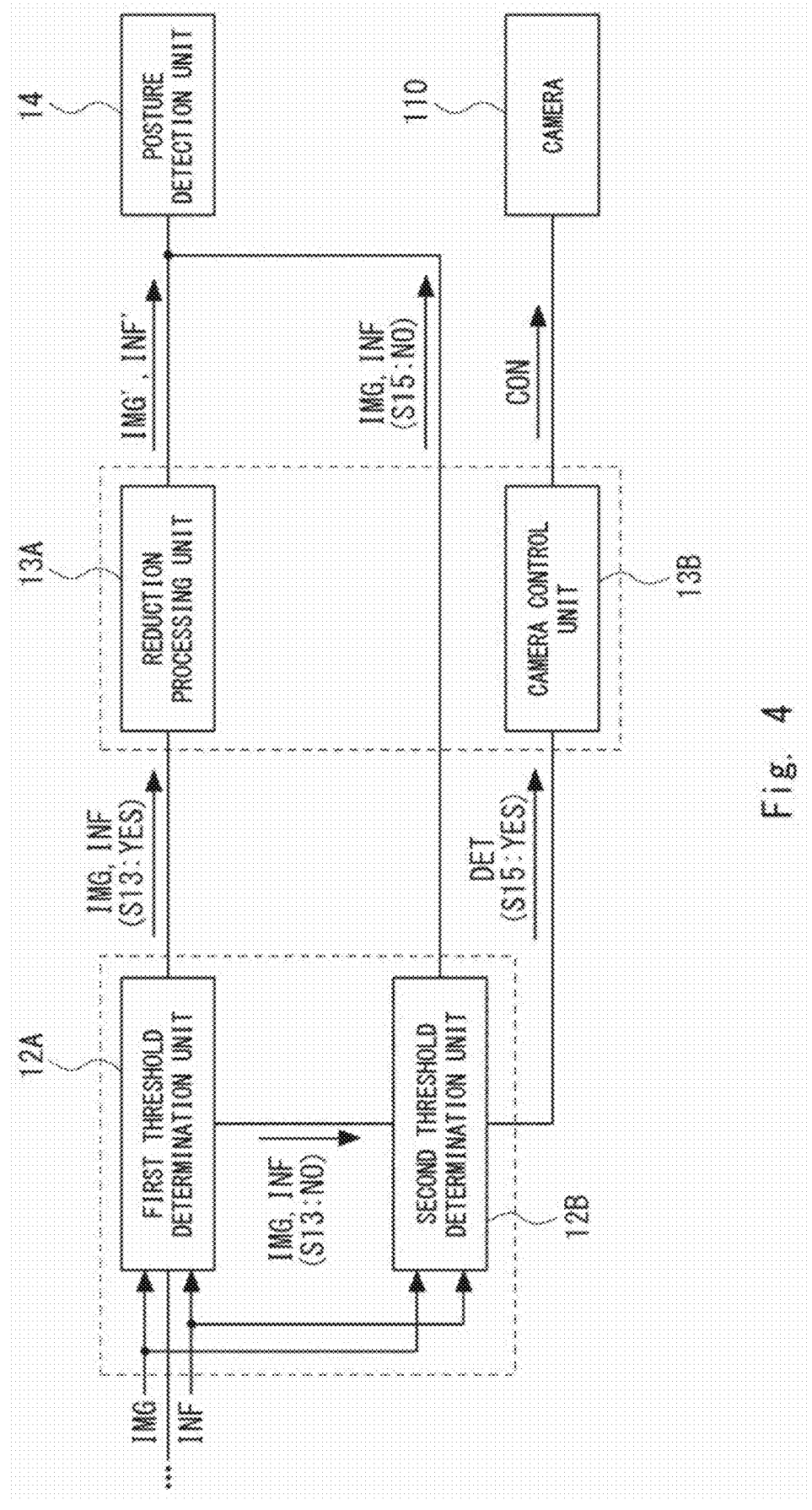
FIG. 4 is a diagram illustrating configurations of a size determination unit and a size adjustment processing unit according to the first example embodiment in more detail.

Next, a posture detection operation in the posture estimation system 100 will be described. FIG. 3 is a flowchart of a posture detection operation of the posture estimation system 100 according to the first example embodiment. Further, FIG. 4 illustrates the configurations of the size determination unit 12 and the size adjustment processing unit 13 in more detail.

Step S11

The camera 110 acquires an image IMG of a monitoring target zone Z to which the camera 110 is directed at an installed position of the camera 110, and outputs the image IMG to the subject detection unit 11 of the posture estimation apparatus 10.

Step S12

The subject detection unit 11 performs processing of detecting a subject appearing in the image IMG received from the camera 110. When the subject appears in the image IMG, the subject detection unit 11 outputs information INF indicating the detected subject and the image IMG to the size determination unit 12.

Step S13

When the subject detection unit 11 detects the subject H1, a first threshold determination unit 12A of the size determination unit 12 determines whether a size L of the subject H1 in the image IMG is larger than a first threshold $L_{TH1}$. When the size L of the subject H1 in the image IMG is larger than the first threshold $L_{TH1}$, the first threshold determination unit 12A outputs the image IMG and the information INF indicating the detected subject to a reduction processing unit 13A of the size adjustment processing unit 13. When the size L of the subject H1 in the image IMG is smaller than or equal to the first threshold $L_{TH1}$, the first threshold determination unit 12A outputs the image IMG and the information INF indicating the detected subject to a second threshold determination unit 12B of the size determination unit 12.

Step S14

When it is determined in step S13 that the size L of the subject H1 is larger than the first threshold $L_{TH1}$, the reduction processing unit 13A performs processing of reducing the image IMG including the subject H1 so that the size L of the subject H1 becomes smaller than or equal to an image size maximum value $L_{MAX}$. The image size maximum value $L_{MAX}$ can be set as any value smaller than or equal to the first threshold $L_{TH1}$. Then, the reduction processing unit 13A outputs an image IMG' after the reduction processing and information INF' indicating the subject H1 in the image IMG' to the posture detection unit 14.

Step S15

When it is determined in step S13 that the size L of the subject H1 is smaller than or equal to the first threshold $L_{TH1}$, the second threshold determination unit 12B further determines whether the size L of the subject H1 is smaller than the second threshold $L_{TH2}$. When the size L of the subject H1 is smaller than the second threshold $L_{TH2}$, the second threshold determination unit 12B outputs a determination result DET to a camera control unit 13B of the size adjustment processing unit 13. When the size L of the subject H1 is larger than or equal to the second threshold $L_{TH2}$, the second threshold determination unit 12B outputs the image IMG and the information INF indicating the detected subject to the posture detection unit 14.

Step S16

When it is determined in step S15 that the size L of the subject is smaller than the second threshold $L_{TH2}$, the camera control unit 13B of the size adjustment processing unit 13 performs a PTZ control of the camera 110 so that the size L of the subject H1 becomes larger than or equal to an image size minimum value $L_{MIN}$. The image size minimum value $L_{MIN}$ can be set as any value larger than or equal to the second threshold $L_{TH2}$. Specifically, the camera control unit 13B instructs the camera 110 to zoom in on the subject, that is, optically enlarge the subject, and then re-images the subject so that the subject H1 appears in a desired size in the image captured by the camera 110. Furthermore, in a case where the subject H1 protrudes from the image as a result of zooming in by the camera 110, the camera control unit 13B may appropriately instruct the camera 110 to change P (pan, angle of view) and T (tilting, angle of elevation). Thereafter, the image IMG obtained by re-imaging the subject is output to the posture detection unit 14.

Here, the significance of re-imaging the subject in the camera 110 after optically enlarging the subject will be described. In general, in a case where the subject is simply enlarged (for example, so-called digitally zoomed-in on) by image processing or the like, the contour or shade of the subject's area becomes unclear. When a posture is detected based on such an image, the posture detection accuracy decreases. Therefore, in the present example embodiment, the subject is re-imaged after optically enlarging the subject. As a result, the subject can be captured in a high-definition image, and a posture can be detected based on the image, thereby realizing highly accurate posture detection.

Meanwhile, in the present example embodiment, when a subject is excessively large, the subject is simply reduced by image processing or the like. This is because, in general, even if the image is simply reduced, the contour and the shade of the subject's area do not become unclear, and there is no possibility or low possibility that the posture detection accuracy deteriorates.

Step S17

When no subject is detected in step S12, after step S14, when the determination result is NO in step S15, or after step S16, the posture detection unit 14 performs processing of detecting a posture of the subject H1 appearing in the image based on the image and the information indicating the subject received from the size adjustment processing unit 13.

As described above, when detecting a posture of the subject appearing in the image, in a case where the size of the subject is excessively large, the size of the subject can be reduced to be within a desired range by reducing the image.

Furthermore, in a case where the size of the subject is excessively small, an image obtained by imaging the detected subject enlarged by the zoom function of the camera can be acquired. Then, by performing the posture detection operation illustrated in FIG. 3 again based on the acquired image, a posture of the subject can be detected using an image in which the size of the subject falls within the desired range.

As described above, according to the present configuration, when a size of a subject in an image does not fall within a range defined by the first threshold $L_{TH1}$ that is an upper limit value and the second threshold $L_{TH2}$ that is a lower limit value, the size can be adjusted to a size within a desired range defined by the image size minimum value $L_{MIN}$ and the image size maximum value $L_{MAX}$ and suitable for controlling the posture. Then, a posture can be detected, using an original image of which a size is not adjusted when a size adjustment is not necessary, and using an image of which a size is suitably adjusted when a size adjustment is necessary. This makes it possible to detect a posture with higher accuracy.

Second Example Embodiment

Figure 5:
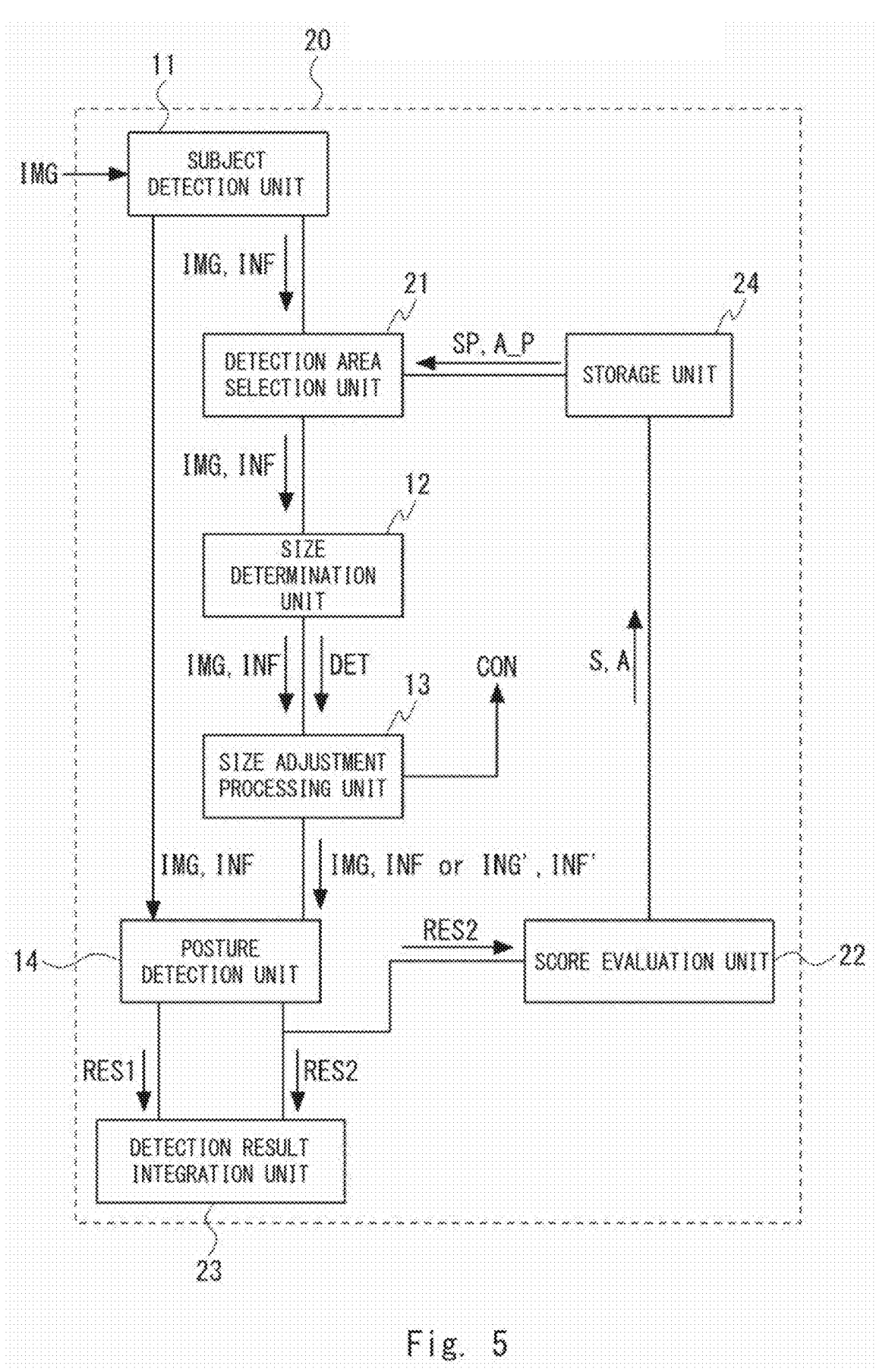
FIG. 5 is a diagram schematically illustrating a configuration of a posture estimation apparatus according to a second example embodiment.

A posture estimation apparatus according to a second example embodiment will be described. FIG. 5 schematically illustrates a configuration of a posture estimation apparatus 20 according to the second example embodiment. The posture estimation apparatus 20 has a configuration in which a detection area selection unit 21, a score evaluation unit 22, a detection result integration unit 23, and a storage unit 24 are added to the posture estimation apparatus 10.

The detection area selection unit 21 compares an area where the subject is detected in the image IMG acquired by the camera 110 and a detection area where the subject is detected in an image IMG_P acquired immediately before the image IMG, and selects either one as a detection area where a posture is to be detected.

The score evaluation unit 22 evaluates whether the detected object is a subject based on the posture detection result, and assigns a score S.

As will be described below, the detection result integration unit 23 integrates two posture detection results acquired under different conditions.

The storage unit 24 stores in advance the previous image IMG_P and information on the detection area. In addition, the score evaluation unit 22 stores a score S assigned to the current image IMG and a detection area A thereof in the storage unit 24. Note that the score S and the detection area A that have been stored are used as a previous image IMG_P and a detection area thereof for a next image to be acquired by the camera 110.

Figure 6:
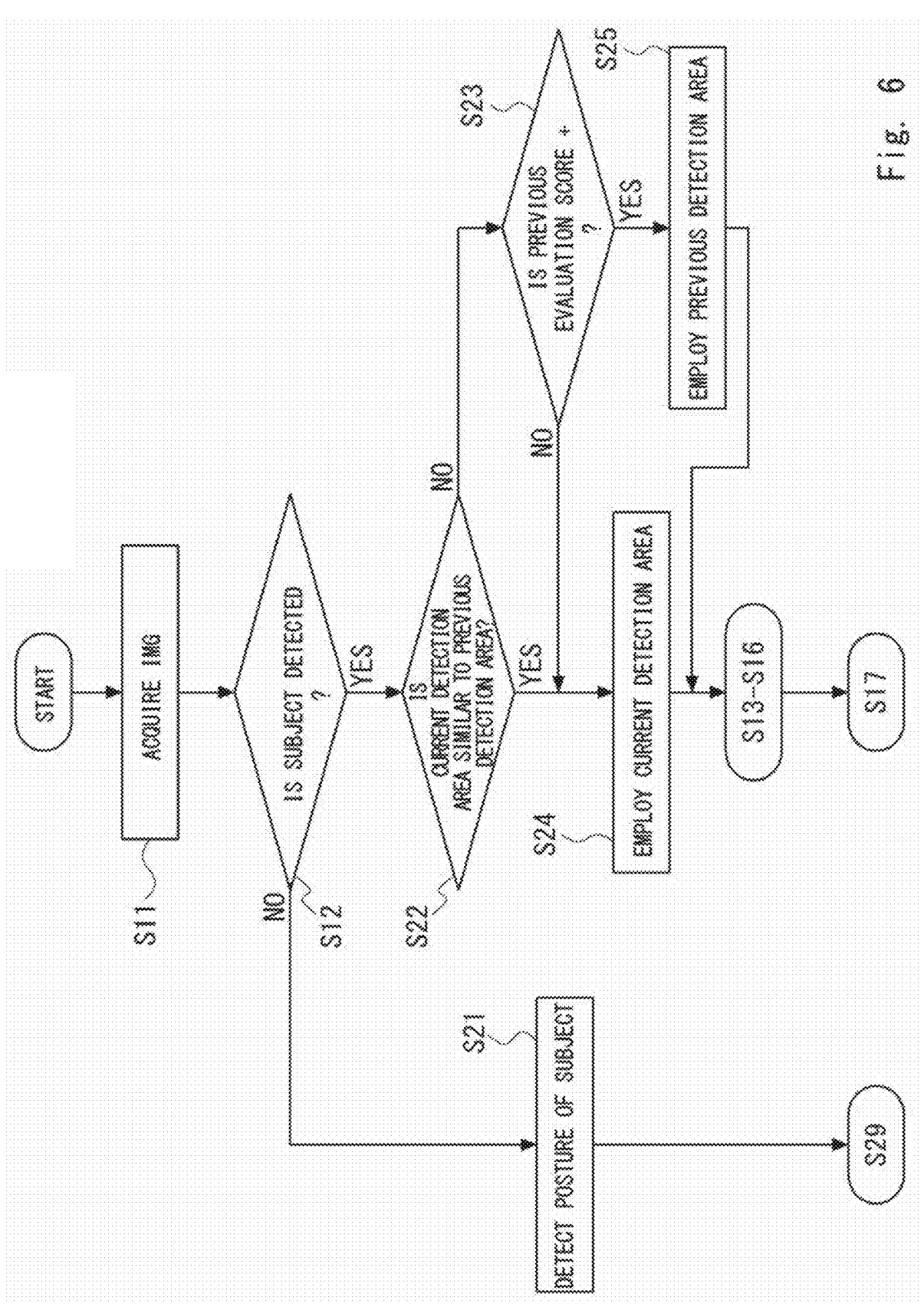
FIG. 6 is a flowchart of a posture detection operation of a posture estimation system according to the second example embodiment.
Figure 7:
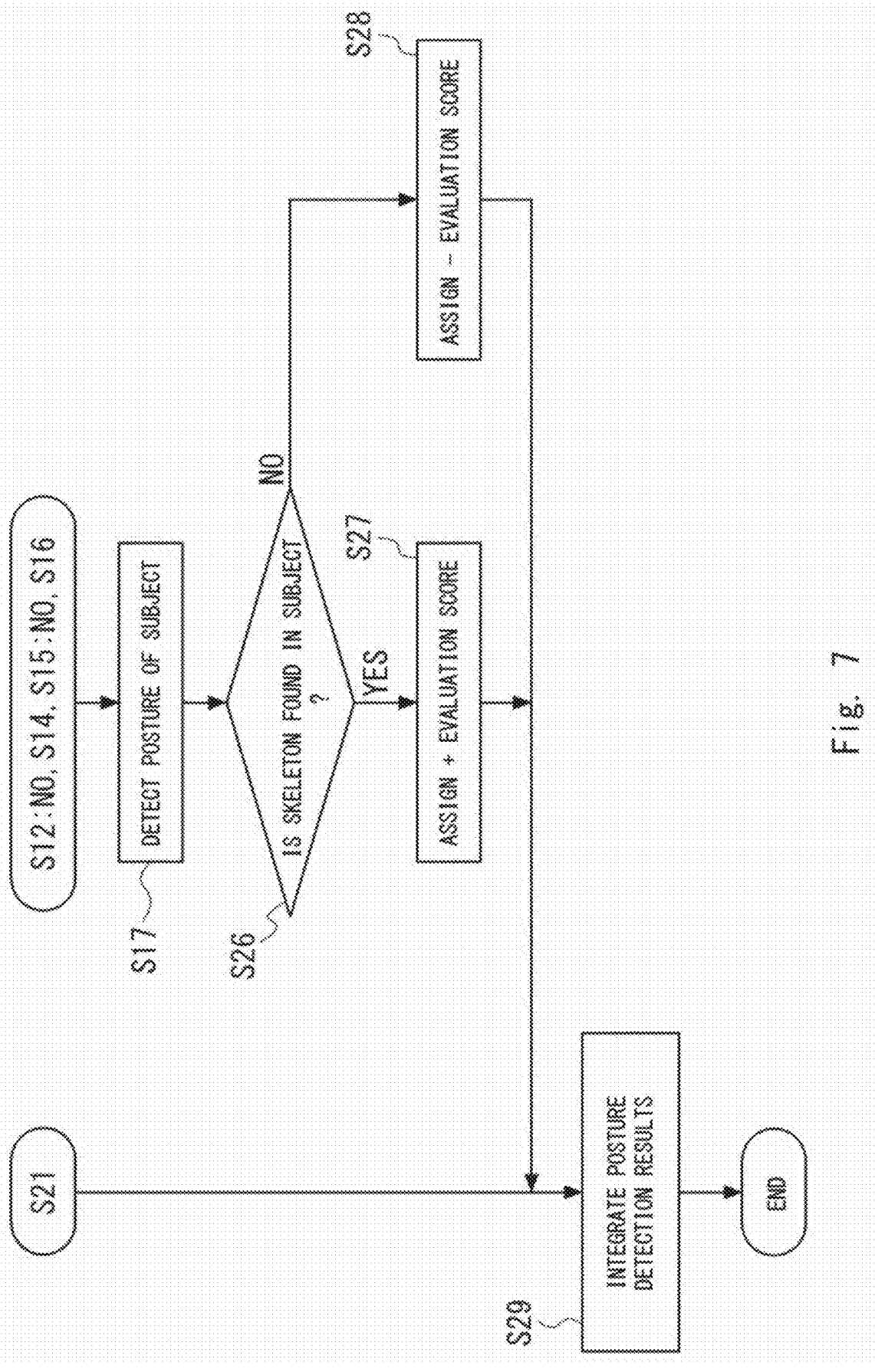
FIG. 7 is a flowchart of a posture detection operation of the posture estimation system according to the second example embodiment.

Next, a posture detection operation in the posture estimation system according to the second example embodiment will be described. FIGS. 6 and 7 are flowcharts for a posture detection operation of a posture estimation system 200 according to the second example embodiment. In the posture detection operation of the posture estimation system 200 according to the second example embodiment, steps S21 to S29 are added to steps S11 to S17 of FIG. 3.

Step S11

Similarly to the first example embodiment (FIG. 3), the camera 110 acquires an image IMG of a monitoring target zone Z to which the camera 110 is directed at an installed position of the camera 110, and outputs the image IMG to the subject detection unit 11 of the posture estimation apparatus 20.

Step S12

Similarly to the first example embodiment (FIG. 3), the subject detection unit 11 performs processing of detecting a subject appearing in the image IMG received from the camera 110. When the subject appears in the image IMG, the subject detection unit 11 outputs information INF indicating the detected subject and the image IMG to the size determination unit 12 and the posture detection unit 14.

Step S21

When no subject is detected in step S12, the posture detection unit 14 performs processing of detecting a posture of a subject appearing in the image IMG itself acquired by the camera 110.

Step S22

When a subject is detected in step S12, the detection area selection unit 21 determines whether a detection area A in which the subject H1 is detected in the current image IMG is similar to a detection area A_P in which the subject H1 is detected in an image IMG_P acquired last time, that is, in the past closest to the current image IMG. Whether the two detection areas are similar to each other can be determined, for example, by comparing the positions, sizes, and the like of the detection areas. More specifically, for example, the positions of the detection areas on the images, the proportions of the detection areas with respect to the images, the numbers of vertical or horizontal pixels in the detection areas on the images, and the like may be compared. Note that the method of determining and comparing the positions of the detection areas is not limited to that described above, and for example, various methods such as comparison between the coordinates of the centers of the detection areas and comparison of the coordinates of the upper left corners of the detection areas may be used as appropriate. Note that, hereinafter, the current image IMG will also be referred to as a first image, the previous image IMG_P will also be referred to as a second image, the detection area A of the current image IMG will also be referred to as a first detection area, and the detection area A_P of the previous image IMG_P will also be referred to as a second detection area.

Figure 8:
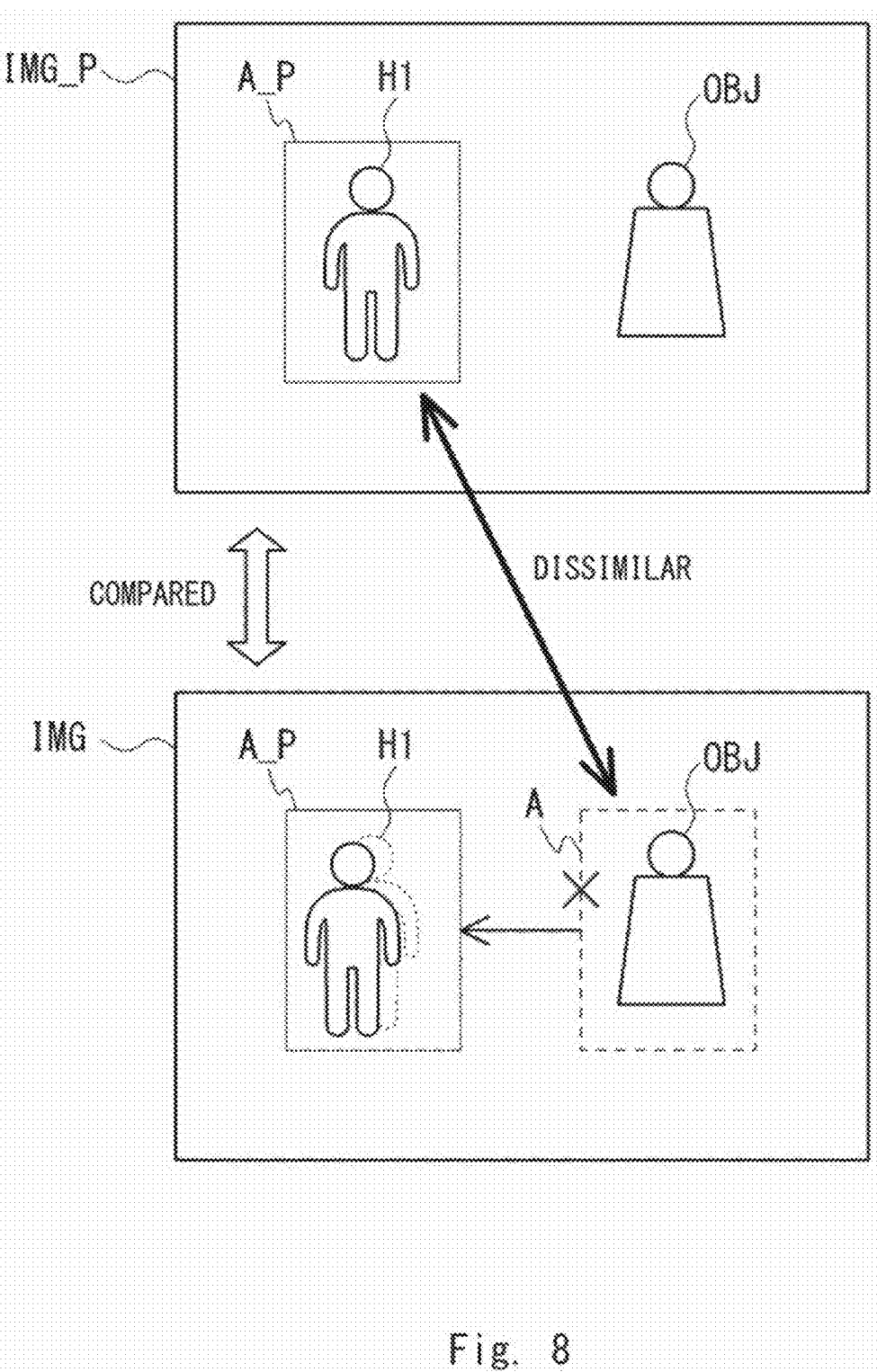
FIG. 8 is a diagram illustrating an example of a case where a detection area of a current image is not similar to a detection area of a previous image.

A case where the two detection areas are not similar to each other will be described using a specific example. FIG. 8 illustrates an example of a case where a detection area A of a current image IMG is not similar to a detection area A_P of a previous image IMG_P. In this example, in the previous image IMG_P, a subject H1 who has appeared is detected as a subject, and a detection area A_P is set. On the other hand, in the current image IMG, instead of the subject H1, an object OBJ is erroneously detected as a subject, and a detection area A is set. Since the position of the detection area A and the position of the detection area A_P are greatly different, the detection area selection unit 21 determines that they are dissimilar.

Figure 9:
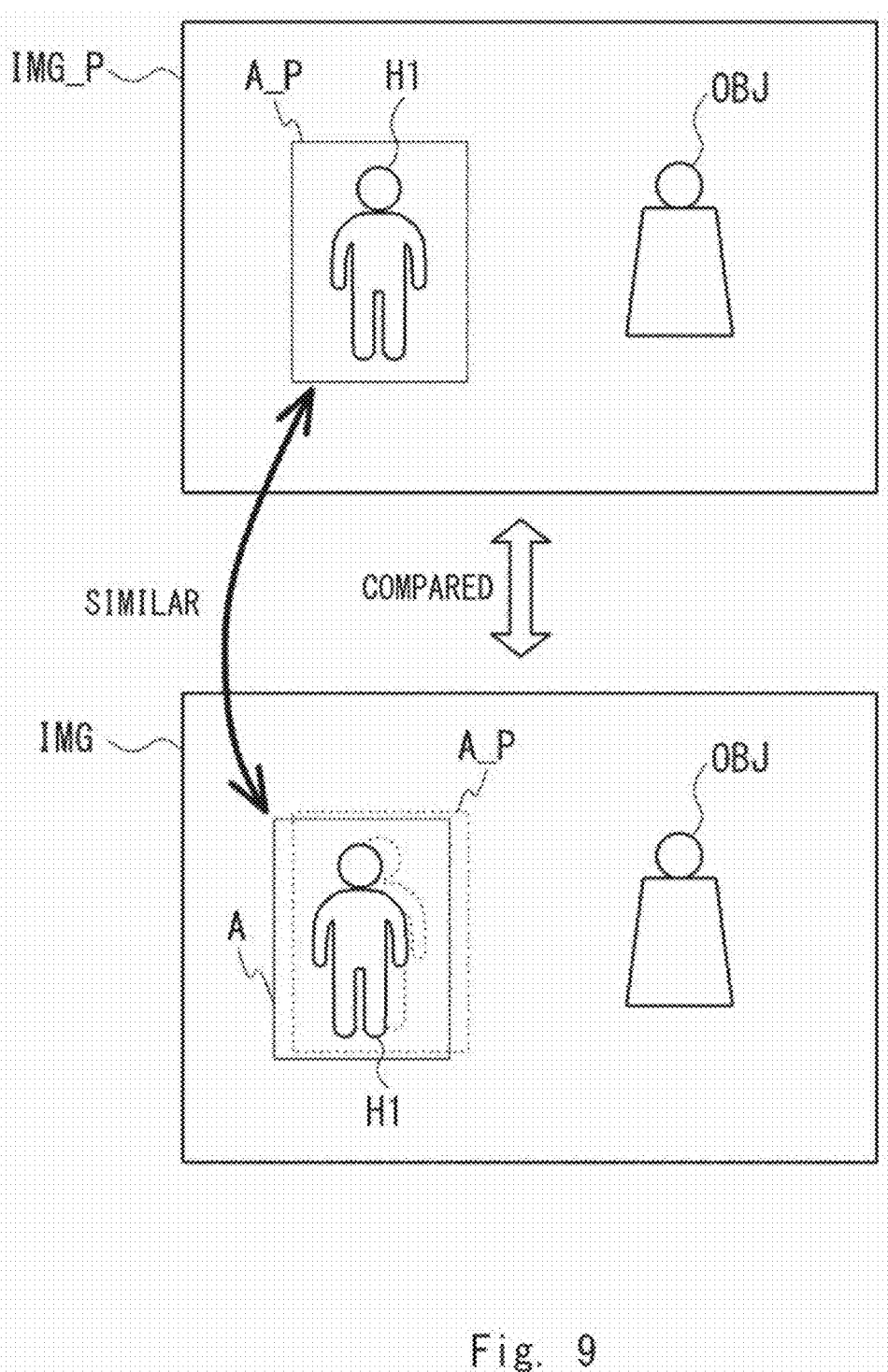
FIG. 9 is a diagram illustrating an example of a case where a detection area of a current image is similar to a detection area of a previous image.

Next, a case where two detection areas are similar to each other will be described using a specific example. FIG. 9 illustrates an example of a case where a detection area A of a current image IMG is similar to a detection area A_P of a previous image IMG_P. In this example, in the previous image IMG_P, a subject H1 who has appeared is detected as a subject, and a detection area A_P is set. In the current image IMG as well, the subject H1 is detected as a subject, and a detection area A is set. Note that, since the current image IMG is acquired later in time than the previous image IMG_P, the position of the subject H1 changes, but timings (a sampling rate) at which images are acquired when posture detection is performed is sufficiently dense. Therefore, the detection area A and the detection area A_P in this case are set at positions sufficiently close to each other. In this case, the detection area selection unit 21 determines that the position of the detection area A is similar to that of the detection area A_P.

Step S23

When the detection area A of the current image IMG is not similar to the detection area A_P of the previous image IMG_P, the detection area selection unit 21 determines whether a value of a score SP given to the previous image IMG_P is positive (+). As will be described below, when the object in the detection area is recognized as a person, the score SP of the previous image IMG_P has a positive (+) value, and when the object in the detection area is not recognized as a person, the score SP of the previous image IMG_P has a negative (−) value. When the value of the score SP is negative (−), the processing proceeds to step S24, and when the value of the score SP is positive (+), the processing proceeds to step S25.

Step S24

When it is determined that the detection area A of the current image IMG is similar to the detection area A_P of the previous image IMG_P (S22: YES) or when the value of the score SP is negative (−) (S23: NO), the detection area selection unit 21 uses the detection area A as it is as a subject detection area in the image IMG. When the value of the score SP is negative (−) (S23: NO), there is a high possibility that the object in the detection area A_P of the previous image IMG_P is not a subject. Therefore, here, the detection area A newly set in the current image IMG is used.

Step S25

When the value of the score SP is positive (+) (S23: YES), the detection area selection unit 21 uses the detection area A_P in the previous image IMG_P instead of the detection area A as the detection area of the subject of the image IMG. Here, the significance of changing the detection area will be described. As illustrated in FIG. 8, in a case where the detection area A and the detection area A_P are dissimilar, it is assumed that objects inside the detection area A and the detection area A_P are different from each other. In addition, while it is not evaluated whether the object in the detection area of the current image IMG is a subject, the object in the detection area A_P of the previous image IMG_P is recognized as a person based on the score SP. Therefore, here, instead of the detection area A, the detection area A_P in which a person can be considered to be detected with high reliability is set to the image IMG, and subsequent processing is performed.

Steps S13 to S17

After step S24 or S25, the processing of steps S13 to S17 is performed similarly to FIG. 3.

Step S26

After step S17, the score evaluation unit 22 evaluates whether the object whose posture has been detected is a subject. Here, the score evaluation unit 22 determines, for example, whether a skeleton of a human body can be found for the object whose posture has been detected. Various methods can be used for finding the skeleton of the human body.

Here, the score will be described. In the present example embodiment, the size determination unit 12 detects a subject in an image, which is an "object" subject appearing in the image based on a condition given in advance or a learned model constructed by machine learning as described above. However, there may be a case where an object other than the person appearing in the image is erroneously detected as a subject. Therefore, it is determined whether the detected subject has a feature peculiar to a person, here, whether the subject has, for example, a skeleton feature of a human body. Then, a score indicating a degree to which the subject is estimated to be a person is assigned based on a determination result, expressing reliability in the result of detecting the subject.

Step S27

When a skeleton of a human body is found in the object whose posture has been detected, that is, when it is determined that the object whose posture has been detected is a person, the score evaluation unit 22 assigns a positive (+) value as a score S to the current image IMG.

Step S28

When a skeleton of a human body is not found in the object whose posture has been detected, that is, when it is determined that the object whose posture has been detected is not a person, the score evaluation unit 22 assigns a negative (−) value as a score S to the current image IMG.

Step S29

The detection result integration unit 23 integrates the posture detection result RES1 obtained in step S17 and the posture detection result RES2 obtained in step S21. The detection results may be integrated by taking a simple sum of the posture detection result RES1 and the posture detection result RES2, or adding a process of integrating similar skeletons between the posture detection result RES1 and the posture detection result RES2 into one.

As described above, according to the present configuration, a posture of a subject can be detected based on a case where it is estimated that a person is normally detected as the subject. As a result, the accuracy in detecting a posture of a subject can be further improved.

Third Example Embodiment

In the first example embodiment, it has been described that the posture estimation system 100 is constituted by the camera 110 and the posture estimation apparatus 10 configured as an apparatus separate from the camera 110. On the other hand, in the present example embodiment, an example in which the camera and the posture estimation apparatus are configured as one system will be described.

Figure 10:
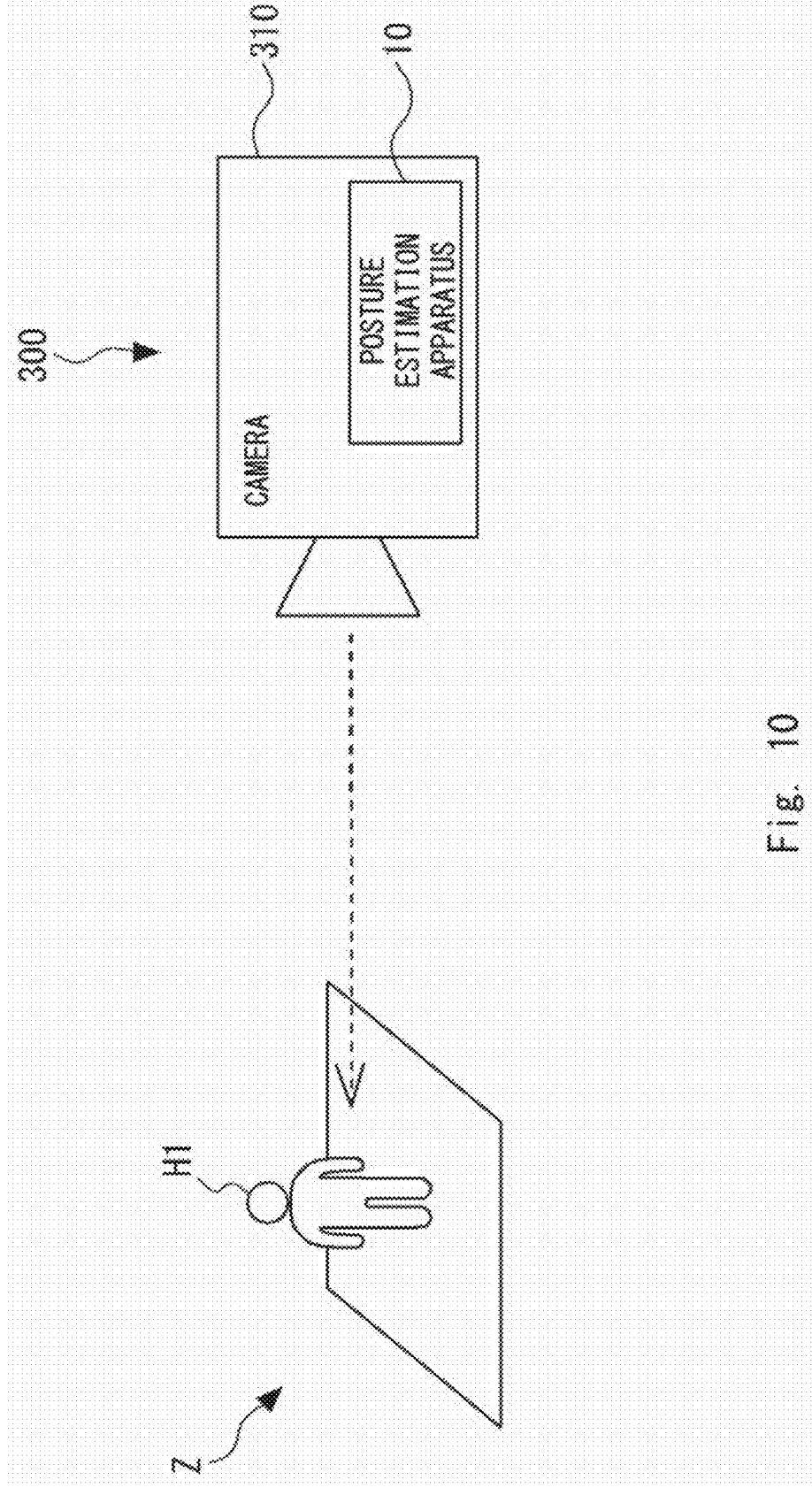
FIG. 10 is a diagram schematically illustrating a configuration of a posture estimation system according to a third example embodiment.

A posture estimation system 300 according to a third example embodiment will be described. FIG. 10 schematically illustrates a configuration of the posture estimation system 300 according to the third example embodiment. The posture estimation system 300 has a configuration in which the posture estimation apparatus 10 is built in a camera 310.

A recent imaging apparatus captures an image using a charge coupled device (CCD) image sensor or a complementary metal oxide semiconductor (CMOS) image sensor. For this reason, a processing apparatus having a high calculation capability is mounted on the imaging apparatus. Therefore, in the present example embodiment, the function of the posture estimation apparatus 10 is realized by a processing apparatus mounted on the imaging apparatus, a processing unit that can be additionally mounted on the processing apparatus, or the like, so that the posture estimation apparatus 10 is built in the camera 310 itself.

As a result, it is possible to provide the posture estimation system 300 constituted by the camera 310 and the posture estimation apparatus 10 built in the camera 310. This makes it possible to realize a more compact posture estimation system.

Other Example Embodiments

Note that the present invention is not limited to the above-described example embodiments, and can be appropriately modified without departing from the gist. For example, although the posture estimation apparatus 10 is built in the camera 310 in the third example embodiment, the posture estimation apparatus 20 according to the second example embodiment may be built in the camera 310.

In the above-described example embodiments, the present invention has been described as a hardware configuration, but the present invention is not limited thereto. The present invention can also realize the processes in the processing apparatus by causing a central processing unit (CPU) to execute a computer program. In addition, the program described above can be stored using various types of non-transitory computer-readable media to be supplied to the computer. The non-transitory computer-readable media include various types of tangible storage media. Examples of the non-transitory computer-readable media include a magnetic recording medium (e.g., a flexible disk, a magnetic tape, or a hard disk drive), a magneto-optical recording medium (e.g., a magneto-optical disc), a CD-read only memory (ROM), a CD-R, a CD-R/W, and a semiconductor memory (e.g., a mask ROM, a programmable ROM (PROM), an erasable PROM (EPROM), a flash ROM, or a random access memory (RAM)). In addition, the program may be supplied to the computer through various types of transitory computer-readable media. Examples of the transitory computer-readable media include electrical signals, optical signals, and electromagnetic waves. The transitory computer-readable media can supply the program to the computer via wired communication paths such as electric wires and optical fibers or wireless communication paths.

An example of the computer will be described. The computer can be realized by various computers such as a dedicated computer and a personal computer (PC). However, the computer does not need to be physically single, and a plurality of computers may be used in a case where distributed processing is executed.

Figure 11:
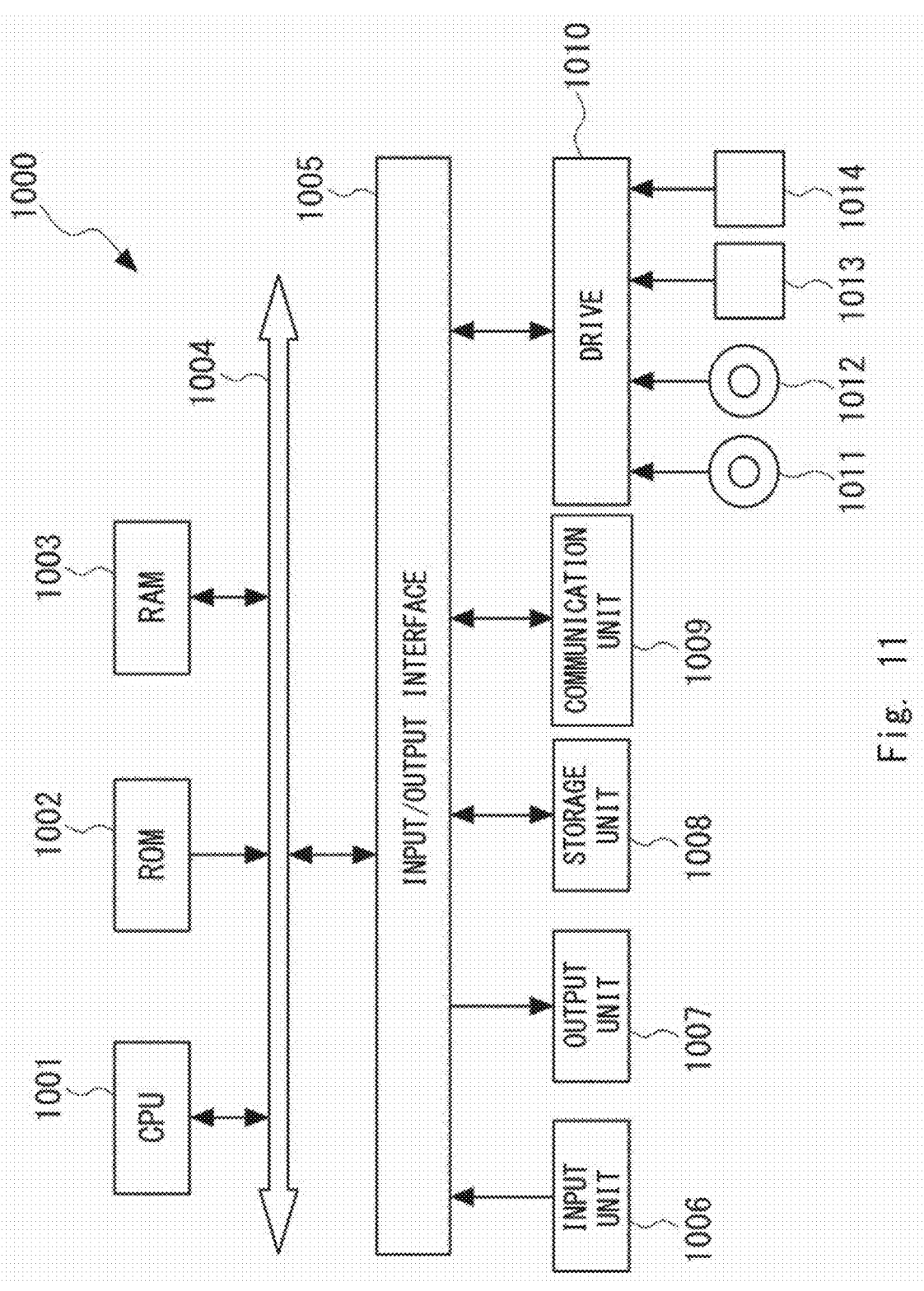
FIG. 11 is a diagram illustrating a configuration example of a computer.

FIG. 11 illustrates a configuration example of a computer. A computer 1000 in FIG. 11 includes a central processing unit (CPU) 1001, a read only memory (ROM) 1002, and a random access memory (RAM) 1003, which are connected to each other via a bus 1004. Note that, although the description of OS software and the like for operating the computer is omitted, it is assumed that a computer constructing the information processing apparatus also has OS software and the like.

An input/output interface 1005 is also connected to the bus 1004. For example, an input unit 1006 including a keyboard, a mouse, a sensor, and the like, an output unit 1007 including a display constituted by a CRT, an LCD, or the like, a headphone, a speaker, and the like, a storage unit 1008 including a hard disk and the like, a communication unit 1009 including a modem, a terminal adapter, and the like are connected to the input/output interface 1005.

The CPU 1001 executes various types of processes according to various programs stored in the ROM 1002 or various programs loaded onto the RAM 1003 from the storage unit 1008, for example, processes of the respective units of the information processing apparatus 100, which will be described below, in the above-described example embodiments. Note that, similarly to the CPU 1001, a graphics processing unit (GPU) may be provided to perform various types of processes according to various programs stored in the ROM 1002 or various programs loaded onto the RAM 1003 from the storage unit 1008, for example, processes of the respective units of the information processing apparatus 100, which will be described below, in the present example embodiments. Note that the GPU is suitable for the purpose of performing typical processes in parallel, and can be applied to processing in a neural network to be described below and the like to improve the processing speed as compared with the CPU 1001. The RAM 1003 also appropriately stores data and the like necessary for the CPU 1001 and the GPU to execute various types of processes.

The communication unit 1009 performs communication processing, for example, via the Internet (not illustrated), transmits data provided from the CPU 1001, and outputs data received from a communication counterpart to the CPU 1001, the RAM 1003, and the storage unit 1008. The storage unit 1008 exchanges information with the CPU 1001, and stores and erases information. The communication unit 1009 also performs processing of communicating with another apparatus with respect to an analog signal or a digital signal.

A drive 1010 is also connected to the input/output interface 1005 as necessary. For example, a magnetic disk 1011, an optical disk 1012, a flexible disk 1013, a semiconductor memory 1014, or the like is appropriately mounted, and a computer program read therefrom is installed in the storage unit 1008 as necessary.

In the above-described example embodiments, it is determined which one is larger and which one is smaller between two values. However, this is merely an example, and a case in which the two values are equal in determining which one is larger and which one is smaller between two values may be handled as necessary. That is, any one of determination as to whether the first value is larger than or equal to the second value or smaller than the second value and determination as to whether the first value is larger than the second value or smaller than or equal to the second value may be adopted as necessary. Any one of determination as to whether the first value is smaller than or equal to the second value or larger than the second value and determination as to whether the first value is smaller than the second value or larger than or equal to the second value may be adopted. In other words, in a case where two determination results are obtained by determining which one is larger and which one is smaller between two values, a case where the two values are equal may be included in either of the two determination results as necessary.

REFERENCE SIGNS LIST 10, 20 POSTURE ESTIMATION APPARATUS
11 SUBJECT DETECTION UNIT
12 SIZE DETERMINATION UNIT
12A FIRST THRESHOLD DETERMINATION UNIT
12B SECOND THRESHOLD DETERMINATION UNIT
13 SIZE ADJUSTMENT PROCESSING UNIT
13A REDUCTION PROCESSING UNIT
13B CAMERA CONTROL UNIT
14 POSTURE DETECTION UNIT
21 DETECTION AREA SELECTION UNIT
22 SCORE EVALUATION UNIT
23 DETECTION RESULT INTEGRATION UNIT
24 STORAGE UNIT
100, 300 POSTURE ESTIMATION SYSTEM
110, 310 CAMERA
1000 COMPUTER
1001 CPU
1002 ROM
1003 RAM

US 12,633,154 B2

13                                                        14

1004 BUS
1005 INPUT/OUTPUT INTERFACE
1006 INPUT UNIT
1007 OUTPUT UNIT
1008 STORAGE UNIT
1009 COMMUNICATION UNIT
1010 DRIVE
1011 MAGNETIC DISK
1012 OPTICAL DISK
1013 FLEXIBLE DISK
1014 SEMICONDUCTOR MEMORY
A, A_PDETECTION AREA
DET DETERMINATION RESULT
H1 SUBJECT
IMG, IMG_P IMAGE
INF INFORMATION
$L_{MAX}$ IMAGE SIZE MAXIMUM VALUE
$L_{MIN}$ IMAGE SIZE MINIMUM VALUE
$L_{TH1}$ FIRST THRESHOLD
$L_{TH2}$ SECOND THRESHOLD
OBJ OBJECT
RES DETERMINATION RESULT
S, SP SCORE
Z MONITORING TARGET ZONE

What is claimed is:

1. A posture estimation apparatus comprising:
at least one memory configured to store instructions; and
at least one processor configured to execute the instructions to:
detect a subject who is a person appearing in a captured image;
determine a size of the subject;
perform processing of adjusting the size of the subject to fall within a predetermined range when the size of the subject is out of the predetermined range; and
detect a posture of the subject based on an image in which the size of the subject falls within the predetermined range, wherein:
the at least one memory stores a score indicating a degree to which a subject detected in a second image captured one time before a first image that is the captured image is estimated as a person, and information indicating a second detection area in which the subject detected in the second image is detected, and
the at least one processor is further configured to execute the instructions to:
determine whether the second detection area of the second image is similar to a first detection area in which the subject is detected in the first image, and select one of the first and second detection areas as a detection area to be applied to the first image based on a determination result;
calculate a score indicating a degree to which the subject is estimated as a person after detecting the posture of the subject in the first image; and
determine a size of the subject in the selected detection area.

2. The posture estimation apparatus according to claim 1, wherein the at least one processor is further configured to execute the instructions to:
determine whether the size of the subject is larger than an upper limit value of the predetermined range, and
when the size of the subject is larger than the upper limit value of the predetermined range, reduce the image such that the size of the subject is smaller than the upper limit value of the predetermined range.

3. The posture estimation apparatus according to claim 1, wherein the at least one processor is further configured to execute the instructions to:
determine whether the size of the subject is smaller than a lower limit value of the predetermined range, and
when the size of the subject is smaller than the lower limit value of the predetermined range, control an imaging apparatus that has captured the image to optically enlarge the subject and capture an image of the optically enlarged subject.

4. The posture estimation apparatus according to claim 3, wherein the at least one processor is further configured to execute the instructions to, when controlling the imaging apparatus that has captured the image to enlarge the subject and capture the image of the enlarged subject, detect the posture of the subject based on the image captured after the control.

5. The posture estimation apparatus according to claim 1, wherein the at least one processor is further configured to execute the instructions to:
when the second detection area is similar to the first detection area, select the second detection area as the detection area to be applied to the first image, and
when the second detection area is not similar to the first detection area, select the first detection area as the detection area to be applied to the first image.

6. A posture estimation method comprising:
detecting a subject who is a person appearing in a captured image;
determining a size of the subject;
performing processing of adjusting the size of the subject to fall within a predetermined range when the size of the subject is out of the predetermined range;
detecting a posture of the subject based on an image in which the size of the subject falls within the predetermined range;
storing a score indicating a degree to which a subject detected in a second image captured one time before a first image that is the captured image is estimated as a person, and information indicating a second detection area in which the subject detected in the second image is detected;
determining whether the second detection area of the second image is similar to a first detection area in which the subject is detected in the first image, and selecting one of the first and second detection areas as a detection area to be applied to the first image based on a determination result;
calculating a score indicating a degree to which the subject is estimated as a person after detecting the posture of the subject in the first image; and
determining a size of the subject in the selected detection area.

7. A non-transitory computer-readable medium storing a program for causing a computer to execute:
processing of detecting a subject who is a person appearing in a captured image;
processing of determining a size of the subject;
processing of performing processing of adjusting the size of the subject to fall within a predetermined range when the size of the subject is out of the predetermined range; and
processing of detecting a posture of the subject based on an image in which the size of the subject falls within the predetermined range;
processing of storing a score indicating a degree to which a subject detected in a second image captured one time before a first image that is the captured image is estimated as a person, and information indicating a second detection area in which the subject detected in the second image is detected;

processing of determining whether the second detection area of the second image is similar to a first detection area in which the subject is detected in the first image, and selecting one of the first and second detection areas as a detection area to be applied to the first image based on a determination result;

processing of calculating a score indicating a degree to which the subject is estimated as a person after detecting the posture of the subject in the first image; and processing of determining a size of the subject in the selected detection area.

8. The posture estimation method according to claim 6, further comprising:

determining whether the size of the subject is larger than an upper limit value of the predetermined range, and when the size of the subject is larger than the upper limit value of the predetermined range, reducing the image such that the size of the subject is smaller than the upper limit value of the predetermined range.

9. The posture estimation method according to claim 6, further comprising:

determining whether the size of the subject is smaller than a lower limit value of the predetermined range, and when the size of the subject is smaller than the lower limit value of the predetermined range, controlling an imaging apparatus that has captured the image to optically enlarge the subject and capture an image of the optically enlarged subject.

10. The posture estimation method according to claim 9, further comprising, when controlling the imaging apparatus that has captured the image to enlarge the subject and capture the image of the enlarged subject, detecting the posture of the subject based on the image captured after the control.

11. The posture estimation method according to claim 6, further comprising:

when the second detection area is similar to the first detection area, selecting the second detection area as the detection area to be applied to the first image; and when the second detection area is not similar to the first detection area, selecting the first detection area as the detection area to be applied to the first image.

12. The non-transitory computer-readable medium storing the program according to claim 7, the program causing the computer to further execute:

processing of determining whether the size of the subject is larger than an upper limit value of the predetermined range, and when the size of the subject is larger than the upper limit value of the predetermined range, processing of reducing the image such that the size of the subject is smaller than the upper limit value of the predetermined range.

13. The non-transitory computer-readable medium storing the program according to claim 10, the program causing the computer to further execute:

processing of determining whether the size of the subject is smaller than a lower limit value of the predetermined range, and when the size of the subject is smaller than the lower limit value of the predetermined range, processing of controlling an imaging apparatus that has captured the image to optically enlarge the subject and capture an image of the optically enlarged subject.

14. The non-transitory computer-readable medium storing the program according to claim 13, the program causing the computer to further execute, when controlling the imaging apparatus that has captured the image to enlarge the subject and capture the image of the enlarged subject, processing of detecting the posture of the subject based on the image captured after the control.

15. The non-transitory computer-readable medium storing the program according to claim 7, the program causing the computer to further execute:

when the second detection area is similar to the first detection area, processing of selecting the second detection area as the detection area to be applied to the first image; and when the second detection area is not similar to the first detection area, processing of selecting the first detection area as the detection area to be applied to the first image.

* * * * *